United States Patent
Childers et al.

(10) Patent No.: US 9,213,121 B2
(45) Date of Patent: Dec. 15, 2015

(54) ACOUSTIC SENSING SYSTEM FOR DETERMINING AN INTERFACE BETWEEN TWO MATERIALS

(71) Applicants: Brooks Childers, Christiansburg, VA (US); Roger Duncan, Christiansburg, VA (US)

(72) Inventors: Brooks Childers, Christiansburg, VA (US); Roger Duncan, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 395 days.

(21) Appl. No.: 13/712,233

(22) Filed: Dec. 12, 2012

(65) Prior Publication Data
US 2014/0160888 A1    Jun. 12, 2014

(51) Int. Cl.
| | |
|---|---|
| *G01V 1/40* | (2006.01) |
| *G01V 1/48* | (2006.01) |
| *G01F 23/292* | (2006.01) |
| *E21B 47/04* | (2012.01) |
| *G01H 9/00* | (2006.01) |

(52) U.S. Cl.
CPC .............. *G01V 1/40* (2013.01); *E21B 47/042* (2013.01); *G01F 23/292* (2013.01); *G01F 23/2927* (2013.01); *G01V 1/48* (2013.01); *G01H 9/004* (2013.01)

(58) Field of Classification Search
CPC .......... G01V 1/40; G01V 1/48; G01F 23/292; G01F 23/2927
USPC ................... 367/25, 26, 28, 30, 86
See application file for complete search history.

(56) References Cited

U.S. PATENT DOCUMENTS

| | | | |
|---|---|---|---|
| 5,015,995 A | 5/1991 | Holroyd | |
| 5,164,608 A | 11/1992 | Vali et al. | |
| 5,299,128 A * | 3/1994 | Antoine et al. | 367/68 |
| 5,678,643 A * | 10/1997 | Robbins et al. | 175/45 |
| 6,216,090 B1 * | 4/2001 | Hagiwara | 702/7 |
| 6,693,285 B1 | 2/2004 | Weiss | |
| 7,472,594 B1 | 1/2009 | Davies | |
| 8,848,485 B2 * | 9/2014 | Bostick, III | 367/35 |
| 2007/0169933 A1 | 7/2007 | Heller et al. | |
| 2012/0092960 A1 * | 4/2012 | Gaston et al. | 367/35 |
| 2013/0167628 A1 * | 7/2013 | Hull et al. | 73/152.58 |

OTHER PUBLICATIONS

International Search Report and Written Opinon, Date of Mailing Mar. 5, 2014, International application No. PCT/US2013/069148, Korean Intellectual Property Office, International Search Report 5 pages, Written Opinion 5 pages.

(Continued)

*Primary Examiner* — Ian J Lobo
(74) *Attorney, Agent, or Firm* — Cantor Colburn LLP

(57) ABSTRACT

A system for locating an interface between a first material and a second material including one or more acoustic sensing elements operatively arranged to measure a characteristic of one or more acoustic signals at a plurality of locations along a length thereof. An instrumentation unit is coupled with the one or more acoustic sensing elements, and arranged to determine a difference between at least a first value of the characteristic measured at a first location and a second value of the characteristic measured at a second location of the plurality of locations for identifying the interface between the first material and the second material as being located between the first and second locations if the difference is greater than a preselected threshold amount. A method of locating an interface is also included.

18 Claims, 1 Drawing Sheet

(56) References Cited

OTHER PUBLICATIONS offshore technology.com, [online]; [retrieved on Feb. 4, 2013]; retrieved from the Internet http://www.offshore-technology.com/contractors/cables/brugg-cables/, Brugg Cables Well Connected, A company of the Brugg Group, "Brugg Cables—Distributed Fiber-Optic Sensing Systems," Copyright 2012.

Qorex, [online]; [retrieved on Feb. 4, 2013]; retrieved from the Internet http://qorexllc.com/QOREX%20-DTS%20+%20Acoustic%20Product%20Bulletin%20Rev1%20-March%202010.pdf, "Fibre Optic Distributed Temperature and Acoustic Sensor," Qorex Product Bulletin, Mar. 2010, 4p.

U.S. Department of Energy, [online]; [retrieved on Feb. 4, 2013]; retrieved from the Internet http://www1.eere.energy.gov/geothermal/pdfs/peer_review_2010/high_pantea_acoustic_sensor.pdf, "Multipurpose Acoustic Sensor for Downhole Fluid Monitoring," Geothermal Technologies Program 2010 Peer Review, May 19, 2010; 16p.

* cited by examiner

ACOUSTIC SENSING SYSTEM FOR DETERMINING AN INTERFACE BETWEEN TWO MATERIALS

BACKGROUND

Various industries would benefit from a system which accurately and cost-effectively identifies an interface between two different materials. For example, in the downhole drilling and completions industry, tanks and vessels are utilized for storing a plurality of materials such as treatment and stimulation fluids that must be pumped downhole. The identification of the aforementioned interface can be used for example to determine and monitor the level of the stored materials in these vessels and tanks, i.e., the interface between formed between the stored material and air. Boreholes themselves represent a structure in which the interfaces between various materials, e.g., between water-bearing and oil-bearing zones, are often desired to be determined. In the above-noted and other applications, new and alternate systems for determining the levels of materials or interfaces therebetween are desired.

SUMMARY

A system for locating an interface between a first material and a second material including one or more acoustic sensing elements operatively arranged to measure a characteristic of one or more acoustic signals at a plurality of locations along a length of the one or more acoustic sensing elements; and an instrumentation unit coupled with the one or more acoustic sensing elements, the instrumentation unit operatively arranged to determine a difference between a first value of the characteristic measured at a first location of the plurality of locations and a second value of the characteristic measured at a second location of the plurality of locations for identifying the interface between the first material and the second material as being located between the first and second locations if the difference is greater than a preselected threshold amount.

A method of locating an interface between a first material and a second material including measuring a characteristic of one or more acoustic signals with one or more acoustic sensing elements at a plurality of locations within a volume; and comparing a first value of the characteristic measured at a first location of the plurality of locations with a second value of the characteristic measured at a second location of the plurality of locations; and determining the interface between the first material and the second material to be located between the first location and the second location if the first and second values differ by at least a preselected threshold amount.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
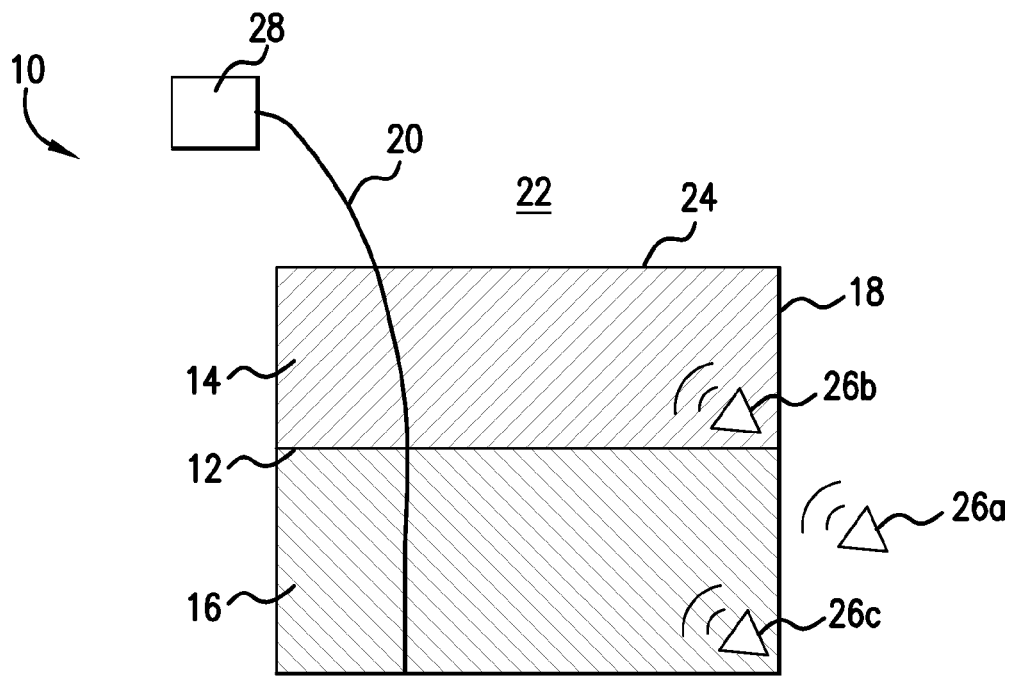
FIG. 1 schematically illustrates a system for determining an interface between a first material and a second material with an acoustic sensing element.

Referring now to FIG. 1, a system 10 is illustrated for identifying an interface 12 between a first material 14 and a second material 16 within a volume 18. The volume 18 could be defined by any structure, vessel, tank, formation, body, etc. in which two or more materials are or may be present, and which an interface between these materials is desired to be identified. For example, in one embodiment the volume 18 is defined as a storage tank or other vessel and the interface 12 relates to the relative level of the materials stored in the tank or vessel. For example, the structure 18 could initially be filled with a product as represented by the material 16 that is used up, consumed, or otherwise removed or displaced over time and replaced by empty space or air as represented by the material 14. Furthermore, with knowledge of the volume of the structure 18, the amount of the materials 14 and 16 can be calculated. For example, if the known volume of the structure 18 is 100 units and the interface 12 is identified at approximately 60% along the length from the end of an acoustic sensing element 20 (described in more detail below) then there is approximately 60 units of the material 16 in the structure 18. It is noted that the volume 18 could of course have any number of materials forming any number of interfaces therebetween which are detectable by the system 10 and the materials 14 and 16 could be any combination of fluids and solids which create a measurable difference in one or more characteristics of a sound signal, e.g., are associated with a change in acoustic coupling therebetween, as discussed in more detail below.

In one embodiment, the volume 18, in the form of the aforementioned tank or vessel, is located at a job site for drilling or completing a borehole and contains one or more materials pertaining to downhole operations. For example, the interface 12 could relate to the level of various fluids and solids that are stored in a vessel and pumped downhole or used in downhole operations, such as treatment or stimulation fluids, proppant, drilling mud additives, etc. By accurately monitoring the levels of pumped fluids, for example, one can avoid the scenario of running a pump dry, stalling a treatment operation due to the unexpected lack or necessary fluids, etc. In one embodiment, the volume 18 is defined by a borehole, the materials 14 and 16 relating to water-bearing and oil-bearing zones, and interface 12 indicating a location where isolation may be desired for improved production.

In order to identify the interface 12 for any of the above or other purposes, the system 10 includes the acoustic sensing element 20 that extends through the materials 14 and 16 in the volume 18. The element 20 could be in place before one or more of the materials 14 and 16 are added to or otherwise arrive in the volume 18 (e.g., a cable or line pre-installed in a storage tank or vessel), or the element 20 could be installed or run through one or more of the materials 14 and 16 that are already present in the volume 18 (e.g., the sensing element 20 disposed with a tubular string and run downhole). It is additionally noted that the element 20 could extend through a third material 22 located outside of the volume 18. In one embodiment, the third material 22 is air and can be used as a reference for comparing to measurements made of the materials 14 and 16 within the volume 18. In one embodiment, a boundary 24 defined by the volume 18 between the materials 14 and 22 can be used as a known reference point for comparing to the interface 12.

The sensing element 20 is arranged to sense one or more characteristics of sound or acoustic vibrations from one or more sources of noise. The characteristics so sensed could be, or could be representative of, amplitude, frequency, wavelength, etc. In one embodiment, the sensing element 20 is one or more optical fibers operatively arranged for measuring one or more characteristics of a sound signal received by the sensing element 20. For example, such optical fibers may include an optical core or waveguide structure that has one or more features such as fiber Bragg gratings that enable the optical fibers to sense sound or measure characteristics thereof.

Three noise sources 26a, 26b, and 26c are illustrated in FIG. 1 and may be collected referred to as the noise sources 26. Particularly, the noise source 26a is depicted as being located outside of the volume 18, while the sources 26b and 26c are located at different locations within the volume 18. In one embodiment, one or more of the noise sources 26 are representative of ambient noise or any source of ambient noise. In another embodiment, one or more of the noise sources 24 may be a designated noise producing device, e.g., a "pinger", for creating an acoustic signal of known characteristics that can be detected by the acoustic sensing element 20. When arranged as "pingers", each of the noise sources 26 may be arranged to produce a noise signal having the value for the characteristic, e.g., of the same frequency or amplitude (e.g., for redundancy in the system), or of differing values of characteristic, e.g., unique differing frequencies or amplitudes (e.g., for enabling detection of and comparison to each of the differing values for further verification of the location of the interface 12).

The sensing element 20 is arranged to measure sound characteristics at a plurality of locations along its length. In one embodiment, the sensing element 20 is arranged as a fiber optic line, strand, or cable having distributed acoustic sensing, thereby enabling the element 20 to sense noise characteristics at the plurality of locations along its length. Other sensors depending along a signal transmission line or cable may alternatively be utilized. In this way, values of the characteristic or characteristics measured or sensed by the sensing element 20 corresponding to the various locations along the length of the sensing element 20 can be compared to each other, e.g., via an instrumentation unit 28, discussed in more detail below, in order to identify a difference in the measured characteristic or characteristics. This difference in the sensed characteristic or characteristics could be representative of the interface 12, resulting from a change in acoustic coupling at the interface 12 due to dissimilarity in the materials 14 and 16.

As fluctuations of the measured characteristic within the same material are expected, the difference between the measured characteristic at two or more different locations may have to exceed some preselected threshold amount or value to identify the interface 12. For example, if it is known that the margin of error of the sensing element is one unit, then the difference may have to be two or more units in order to register as corresponding to the interference 12. If additionally a ten unit difference is expected to correspond to the interface 12, the threshold amount could be set at or near ten units. Thus, if a difference of the threshold value or greater is detected, it can be determined with relative accuracy that the interface 12 between the two materials 14 and 16 has been identified. In one embodiment, the values are each location are directly compared to each other to determine whether any difference exists, such that the threshold value is effectively zero.

In some embodiments, the interface 12 may be denoted by a sharp transition in the measured characteristic, i.e., between two very close or adjacent locations, while in other embodiments there may be a mixing of the two materials 14 and 16 proximate to the interface 12, which results in the interface 12 being wider and more gradually changing over the course of many locations. For this reason, the comparisons of the measured characteristics can be set to be made by the instrumentation unit over any desired number of locations or set length of the sensing element 20. For example, in the aforementioned example, the expected ten unit difference may not occur between adjacent locations, but rather over the range of dozens or hundreds of incremental locations along the length of the sensing element 20, particularly if arranged for distributed acoustic sensing.

Figure 2:
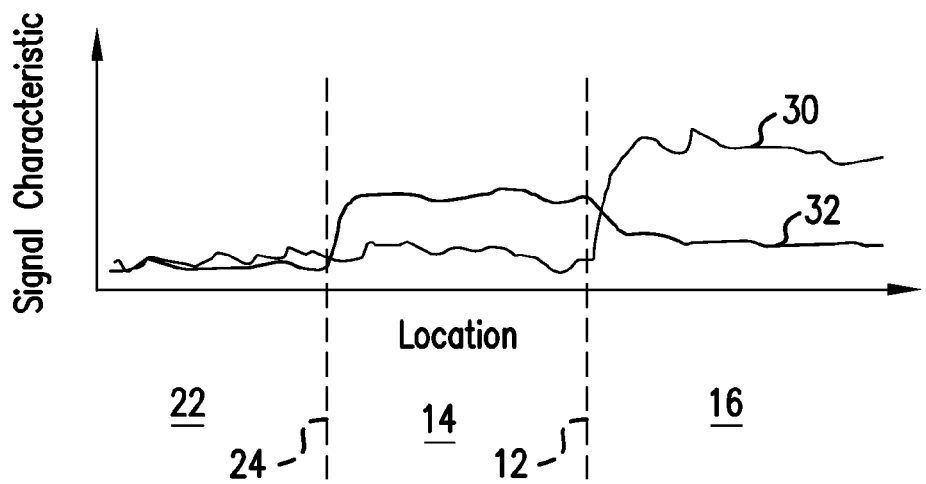
FIG. 2 schematically illustrates two plots corresponding to example scenarios that facilitate an explanation of how the system of FIG. 1 can be utilized to identify the interface.

Two example scenarios are shown schematically in the graph of FIG. 2, which is split into three different regions corresponding to the materials 14, 16, and 22, with the interface 12 and boundary 24 also labeled. A first plot 30 depicts an example in which a sound signal, e.g. ambient noise or sound signal specifically created by corresponding devices, is detected by the sensing element 20 along its length. In the locations corresponding to the material 16, the plot 30 provides a relatively consistent and relatively high value for the measured signal characteristic, with a steep drop off to a relatively lower value corresponding to the material 14. This steep drop off (or difference or delta), is representative of the interface 12, as described above. In the example of the plot 30, there is no noticeable difference at the boundary 24, indicating that the materials 14 and 22 are similar, e.g., the volume 18 being a storage tank containing the material 16 with both the materials 14 and 22 representative of air. A second plot 30 illustrates an example scenario in which each of the regions for the materials 14, 16, and 22 corresponding to a different measured value, indicating a change in acoustic coupling between each of the materials.

The sensing element 20 may be coupled with the instrumentation unit 28, as noted above and illustrated in FIG. 1. The instrumentation unit 28 can be arranged as a computer, processor, optoelectrical device, or other device or combination of devices assisting in the identification of the interface 12 or other boundaries or interfaces. The instrumentation unit 28 can be arranged for interpreting the signals measured by the sensing element 20, creating comparable values out of the signals measured by the sensing element 20, comparing the values of the sound characteristics measured by the sensing element 20 at each of the various locations, etc. In one embodiment, the sensing element 20 is the aforementioned optical fiber or fibers arranged for distributed acoustic sensing and the instrumentation unit 28 includes an optical frequency-domain reflectometry (OFDR) instrument. Other devices or instruments could be used depending on the particular structure of the sensing element 20, the characteristics measured thereby, the desired resolution of the sensing (i.e., distance between measurement locations along the element 20), etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for locating an interface between a first material and a second material, comprising:
    a plurality of acoustic sensing elements operatively arranged to measure a characteristic of one or more acoustic signals at a plurality of locations along a length of the plurality of acoustic sensing elements; and
    an instrumentation unit coupled with the plurality of acoustic sensing elements, the instrumentation unit operatively arranged to determine a difference in acoustic coupling at specific locations in the plurality of acoustic sensing elements between a first value of the characteristic measured at a first location of the plurality of locations and a second value of the characteristic measured at a second location of the plurality of locations for identifying the interface between the first material and the second material as being located between the first and second locations if the difference is greater than a preselected threshold amount.

2. The system of claim 1, wherein the plurality of acoustic sensing elements comprises one or more optical fibers.

3. The system of claim 2, wherein the one or more optical fibers are arranged with one or more fiber Bragg gratings.

4. The system of claim 2, wherein the one or more optical fibers are arranged for distributed acoustic sensing.

5. The system of claim 1, wherein the difference is associated with a change in acoustic coupling between the first and second materials.

6. The system of claim 1, wherein the plurality of acoustic elements are one or more optical fibers and the instrumentation unit is an optical frequency-domain reflectometry instrument.

7. The system of claim 1, wherein the characteristic is amplitude, frequency, wavelength, or a combination including at least one of the foregoing.

8. The system of claim 1, further comprising one or more noise producing devices operatively arranged for producing the acoustic signal.

9. The system of claim 8, wherein the one or more noise producing devices produce the acoustic signal having known values for the characteristic.

10. The system of claim 1, wherein the volume is defined by a storage tank or vessel.

11. The system of claim 1, wherein the first or second materials relate to performance of a downhole operation and include treatment fluids, stimulation fluids, proppant, drilling mud additives, or a combination including at least one of the foregoing.

12. The system of claim 1, wherein the volume is defined by a borehole.

13. The system of claim 12, wherein the interface is associated with a boundary between a water-bearing zone and an oil-bearing zone proximate to the borehole.

14. A method of locating an interface between a first material and a second material, comprising:
    measuring an acoustic coupling a characteristic in a plurality of acoustic sensing elements at a plurality of locations within a volume; and
    comparing a first value of the characteristic measured at a first location of the plurality of locations with a second value of the characteristic measured at a second location of the plurality of locations; and
    determining the interface between the first material and the second material to be located between the first location and the second location if the first and second values differ by at least a preselected threshold amount.

15. The method of claim 14, wherein the plurality of acoustic sensing elements are one or more optical fibers.

16. The method of claim 14, further comprising comparing a third value of the characteristic measured at a third location of the plurality of locations with the first or second values and determining a second interface to be located if a second difference between the third value and the first or second values differs by at least a second preselected threshold amount.

17. The method of claim 14, further comprising producing the acoustic signal with one or more noise producing devices.

18. The system of claim 14, wherein the comparing and the determining are performed by an instrumentation unit coupled to the plurality of acoustic elements.

* * * * *